(12) United States Patent
Healey et al.

(10) Patent No.: US 8,976,854 B1
(45) Date of Patent: Mar. 10, 2015

(54) METHOD AND APPARATUS FOR FEED FORWARD EQUALIZER WITH VARIABLE CURSOR POSITION

(71) Applicant: LSI Corporation, San Jose, CA (US)

(72) Inventors: Adam B. Healey, Newburyport, MA (US); Tomasz Prokop, Pleasanton, CA (US); Volodymyr Shvydun, Los Altos, CA (US); Chaitanya Palusa, Fremont, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/193,170

(22) Filed: Feb. 28, 2014

Related U.S. Application Data

(60) Provisional application No. 61/930,115, filed on Jan. 22, 2014.

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .... *H04L 25/03885* (2013.01); *H04L 25/03038* (2013.01)
USPC ............................ 375/232; 375/229; 375/230

(58) Field of Classification Search
USPC ........................................................ 375/232
See application file for complete search history.

(56) References Cited

U.S. PATENT DOCUMENTS

| | | | | |
|---|---|---|---|---|
| 6,697,424 | B1* | 2/2004 | Yang et al. | 375/233 |
| 2010/0054315 | A1* | 3/2010 | Huang et al. | 375/222 |
| 2011/0150060 | A1* | 6/2011 | Huang et al. | 375/224 |
| 2011/0150071 | A1* | 6/2011 | Takatori et al. | 375/233 |
| 2012/0201289 | A1* | 8/2012 | Abdalla et al. | 375/233 |
| 2013/0230092 | A1* | 9/2013 | Prokop et al. | 375/233 |
| 2014/0146867 | A1* | 5/2014 | Shvydun et al. | 375/233 |

* cited by examiner

*Primary Examiner* — Erin File
(74) *Attorney, Agent, or Firm* — Suiter Swantz pc llo

(57) ABSTRACT

A reconfigurable P-way parallel N-tap feed forward equalizer includes an adaptive filter configured to generate a series of coefficients (taps) and an input register for storing input symbols. A variable cursor position defined by a parameter corresponding to a position in the input register selects a set of pre-cursor and post-cursor taps for dynamic ISI correction of a like set of pre-cursor and post-cursor symbols. Multiplier banks generate partial result symbols by applying the taps to the set of input symbols, and a set of combiners or adder banks generate equalized output symbols from the partial result symbols. Two multiplexers adjust input symbols and coefficients according to the parameter, and a controller allows selection of an optimal parameter, and thus an optimal variable cursor position. The coefficient corresponding to the parameter may additionally be preset to save storage space.

15 Claims, 5 Drawing Sheets

METHOD AND APPARATUS FOR FEED FORWARD EQUALIZER WITH VARIABLE CURSOR POSITION

CROSS-REFERENCE TO RELATED APPLICATIONS

This application claims priority under 35 U.S.C. §119(e) to provisional patent application No. 61/930,115, filed on Jan. 22, 2014. Said application is herein incorporated by reference in its entirety.

TECHNICAL FIELD

This invention relates generally to digital signal processing, and particularly receiver equalization in a serializer/deserializer (SerDes) device.

BACKGROUND

Serializer/deserializer (SerDes) receivers facilitate the transmission of parallel data through a serial link by converting parallel data to serial data, transmitting the serial data through a communications channel, then converting the serial data to parallel data. Signal distortion, loss, noise, or other dispersion effects introduced by the communications channel may require signal equalization in order to correct for inter-symbol interference (ISI) or other impairments. In a digital SerDes receiver, an analog to digital converter (ADC) for sampling and digitizing the received analog signal may be implemented as an analog/mixed signal circuit and all processing of the digitized signal may be accomplished in a digital domain data path. The digital data path may include a variety of filters and equalizers, e.g., a feed forward equalizer (FFE) or a decision feedback equalizer (DFE).

If the data path includes a decision feedback equalizer there will be a "cursor" or received bit currently being processed by the DFE. Similarly, "post-cursor" bits are consecutive bits already processed by the DFE and "pre-cursor" bits are not yet processed by the DFE. The decision feedback equalizer can only correct ISI caused by post-cursor bits; however, inter-symbol interference can also be caused by pre-cursor bits. For optimal SerDes receiver performance, a feed forward equalizer is often used to correct ISI generated by pre-cursor bits. A combination of a feed forward equalizer and decision feedback equalizer, therefore, can correct both pre-cursor and post-cursor ISI. A data path featuring a feed forward equalizer of fixed size followed by a decision feedback equalizer may be used to provide ISI correction via a fixed number of pre-cursor and post-cursor taps.

SUMMARY

Embodiments of the present invention concern a reconfigurable parallel feed forward equalizer with variable cursor position for selection of pre-cursor and post-cursor taps in order to correct a selectable number of pre-cursor and post-cursor symbols for inter-symbol interference (ISI). Dynamic ISI correction through a reconfigurable feed forward equalizer, utilizing a variable number of pre-cursor and post-cursor taps, allows selection of an optimal configuration for any given application or communication channel.

In embodiments, the feed forward equalizer is an N-coefficient parallel FFE with level of parallelism P (where N, P are positive integers) that can store a set of input symbols (digital symbols received from an analog to digital converter) in an input register, each symbol in a unique register position. Two sets of multiplexers at the input—one for adjusting FFE input data and one for adjusting coefficients (ex.—taps, weights)—can both be controlled by a single parameter $D_w$ corresponding to the variable cursor position. The cursor may take any FFE tap position corresponding to a register position: leftmost, rightmost, or any point in between (pre-cursor taps are "left" of the cursor and post-cursor taps are "right" of the cursor). Similarly, in embodiments the parameter $D_w$ can be set to any value in the continuous range of integers greater than or equal to zero and less than P. The set of multiplexers realigns both input data and coefficients to the internal taps (ex.—filters) in the FFE, a matrix of multipliers and combiners (ex.—adders). Furthermore, to save hardware embodiments of the feed forward equalizer may assign the cursor tap a constant value (via the adaptive filter) so as not to occupy a physical location in the FFE samples' storage.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which.

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figures 1, 3:
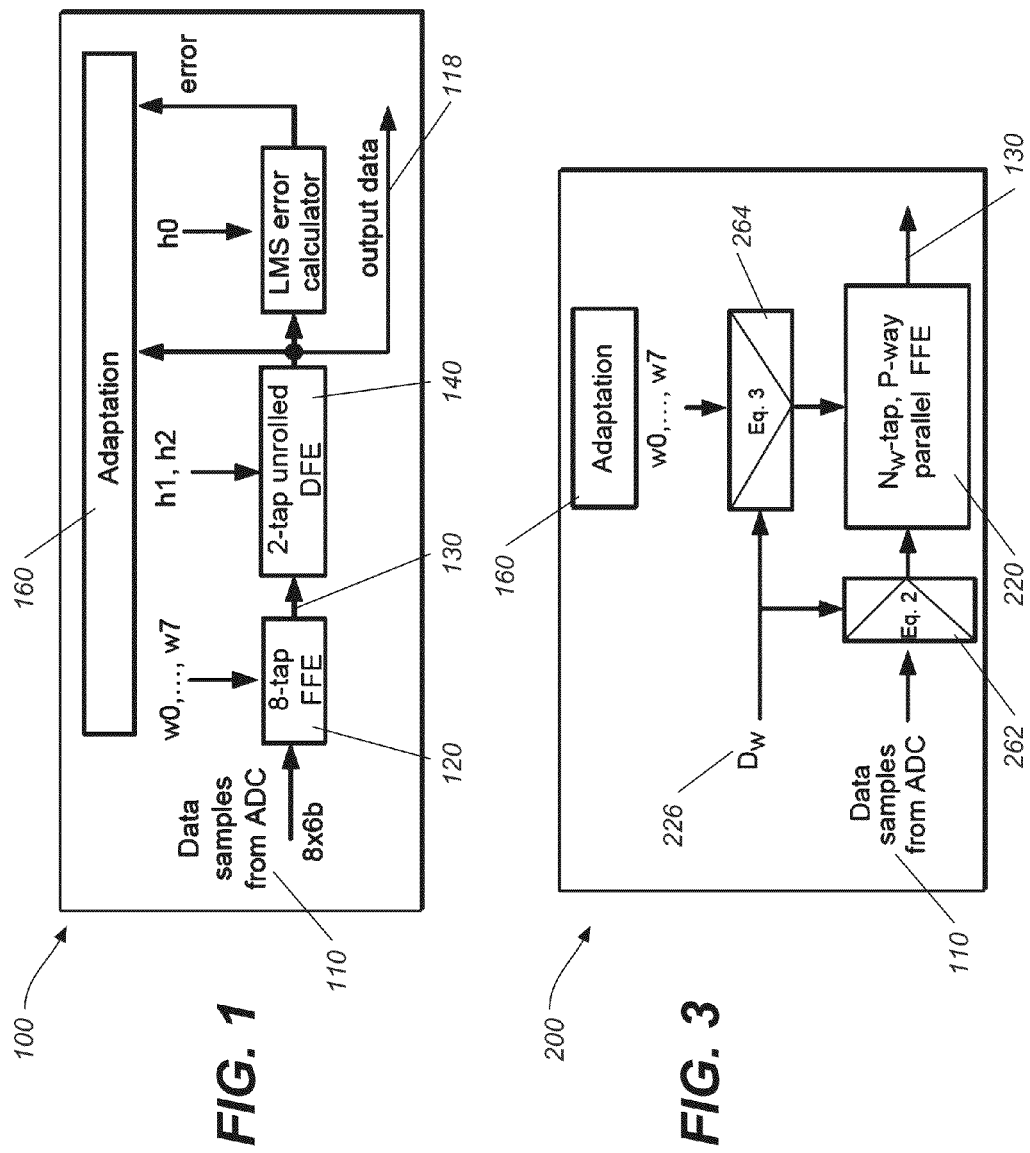
FIG. 1 is an illustration of a data path in a SerDes receiving device.
FIG. 3 is a block diagram of a feed forward equalizer according to an embodiment of the present invention.

FIG. 1 illustrates a SerDes data path 100 that receives data samples 110 from an analog to digital converter (ADC) and generates equalized output symbols 118. An $N_w$-way parallel FFE 120 ($N_w$=8) performs ISI correction on pre-cursor bits; a P-way parallel feed forward equalizer (where P is a positive integer) fixes at ($N_w$−1) the quantity of pre-cursor taps $w_0$, $w_1$, ... $w_7$ for ISI correction. A two-way DFE 140 can correct two post-cursor bits via two taps $h_1$, $h_2$. Adaptive filter 160 defines both pre-cursor and post-cursor taps.

Figure 2:
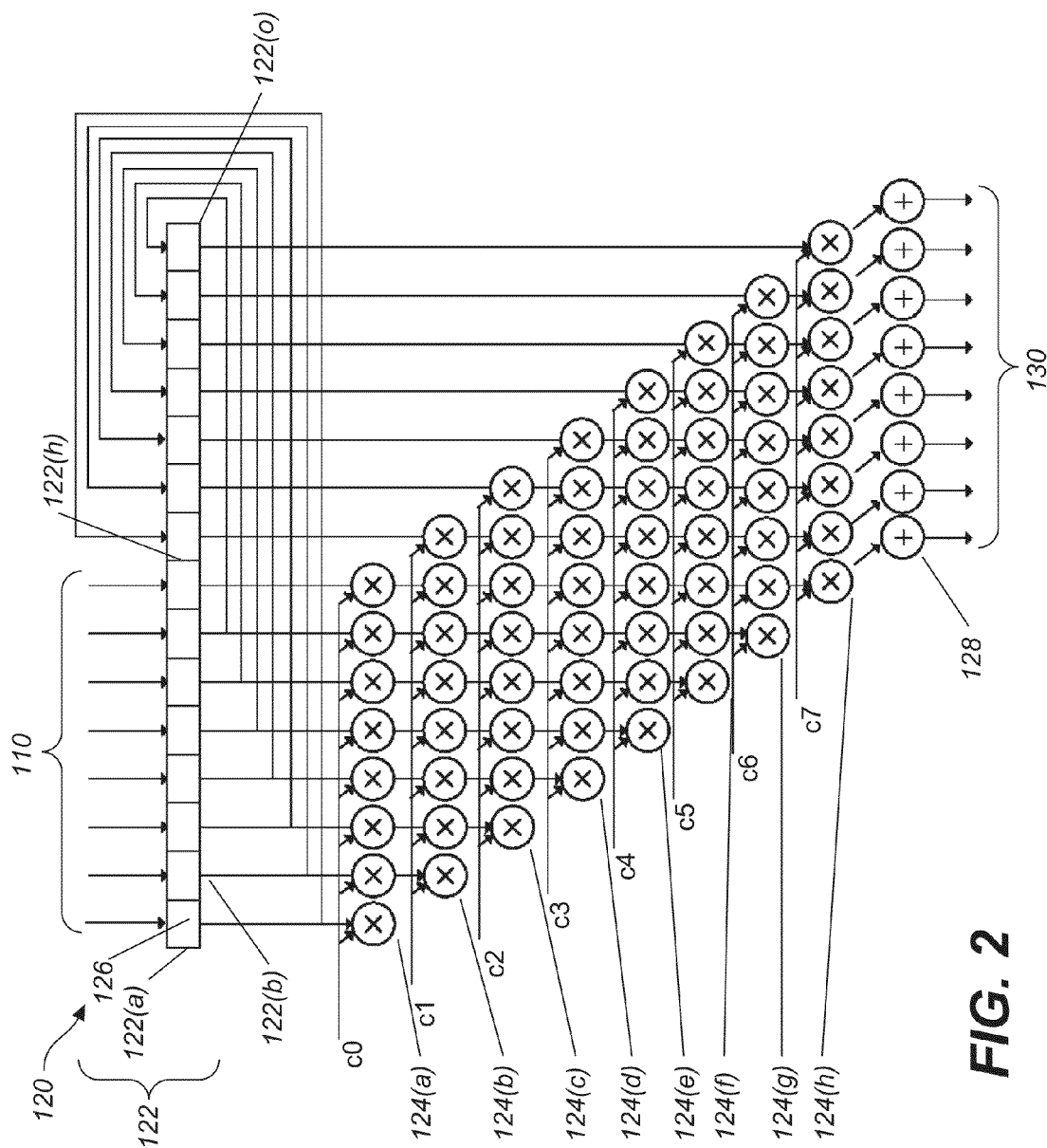
FIG. 2 is an illustration of a feed forward equalizer.

FIG. 2 illustrates an 8-way parallel feed forward equalizer 120. A set 110 of eight input symbols is received by the feed forward equalizer and stored in positions 122(*a*), 122(*b*) ... 122(*h*) of input register 122. Set 110 of input samples is then delayed in register positions 122(*a*), 122(*b*) ... 122(*h*) and loaded into register positions 122(*i*), 122(*j*) ... 122(*o*) respectively. Each of eight multiplier banks $124(a)$, $124(b)$, ... $124(h)$ receives eight input values and multiplies each input value by weighted taps (ex. —coefficients) c0, c1, ... c7. For example, multiplier bank $124(a)$ multiplies input samples in register positions $122(a)$ through $122(h)$ by c0, multiplier bank $124(b)$ multiplies input samples in register positions $122(b)$ through $122(i)$ by c1, etc. Finally, adder bank 128 combines results for each input sample to generate a set 130 of eight ISI-corrected output symbols. Cursor position 126 corresponds to register position $122(a)$ and the latest-in-time input sample stored therein.

FIG. 3 illustrates an embodiment of a SerDes data path 200 including an 8-way parallel reconfigurable feed forward equalizer 220 with a variable cursor position 226 of the present invention. In embodiments, feed forward equalizer 220 is instrumented with coordinated multiplexer sets 262 and 264, for adjusting input data and weighted taps (ex. —coefficients) respectively, and controlled by parameter $D_w$ corresponding to cursor position 226. $N_w$-tap, P-way parallel FFE cursor position 226 may align to any of $N_w$ tap positions. In other words, parameter $D_w$ may take any value between 0 and $(N_w-1)$. In embodiments, adaptive filter 160 of the data path generates FFE weighted taps (ex. —coefficients) $w_0$, $w_1$, ... $w_7$ via least mean squares algorithm.

Figure 4A:
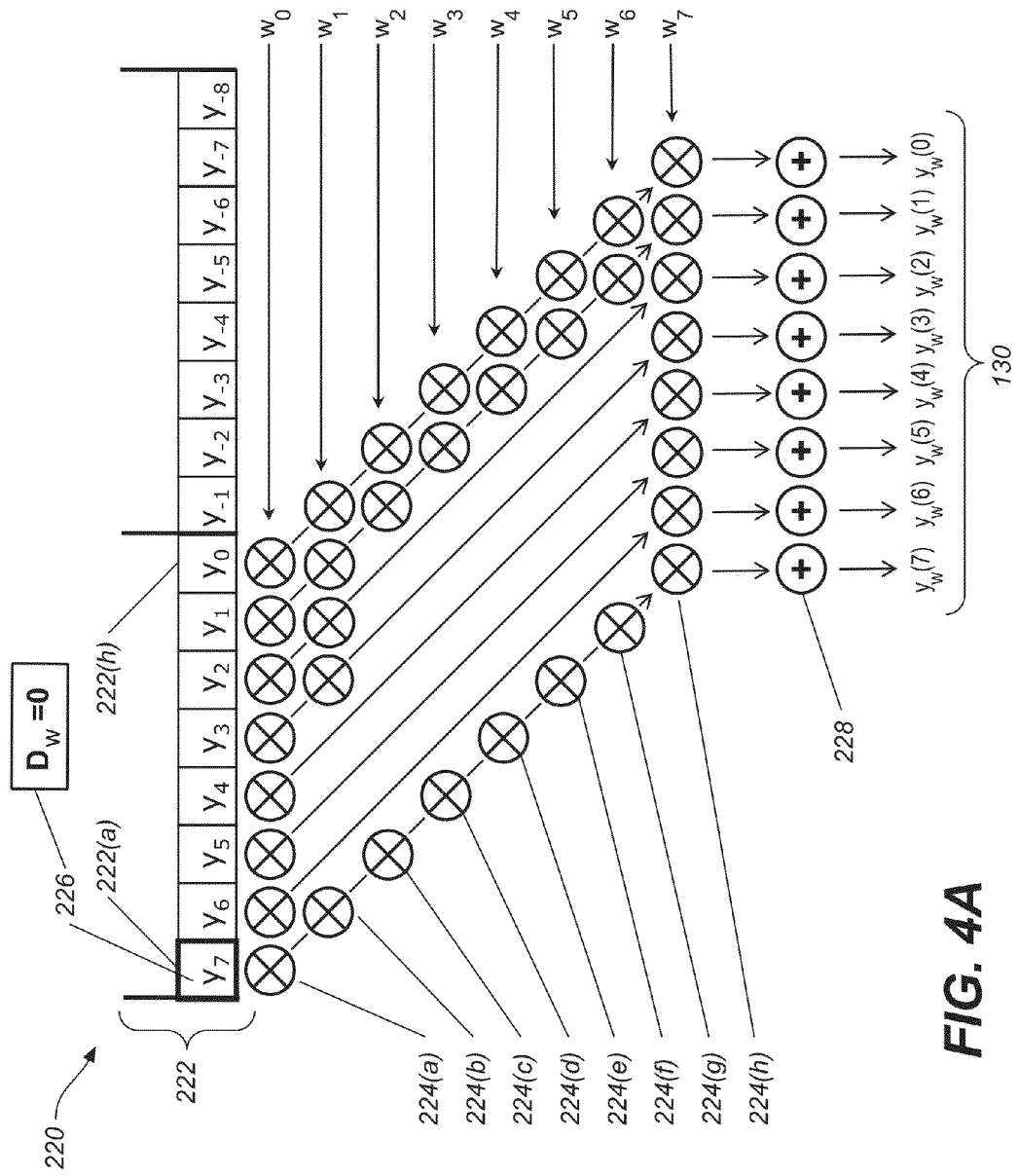
FIG. 4A is a diagram of a feed forward equalizer according to an embodiment of the present invention.

FIG. 4A illustrates an embodiment of an 8-way parallel reconfigurable feed forward equalizer 220 of the present invention. In embodiments where parameter $D_w=0$, cursor position 226 corresponds to the "newest" or latest received input symbol $y_7$ stored in "leftmost" register position $222(a)$. Therefore, there will be no pre-cursor filtering and seven post-cursor filtering taps $w_0$, $w_1$, ... $w_7$ (applied to input signals by multiplier banks $224(a), 224(b), \ldots 224(h)$) in feed forward equalizer 220. Adder bank 228 can then combine filter results for each input sample $y_7, y_6, \ldots y_0$ and generate the corresponding set 130 of output symbols $y_w(7)$, $y_w(6), \ldots y_w(0)$.

Embodiments of the $N_w$-tap, P-way parallel feed forward equalizer 220 can operate on vectors of P values. For example, the vector Y(m) of ADC output samples $y_7, y_6, \ldots y_{-8}$ (where Y denotes a vector quantity and m a corresponding lower case value, e.g., a digital clock index) corresponds to the set 110 of feed forward equalizer input symbols and can be defined by the equation $$Y(m)=[y(Pm)y(Pm+1) \ldots y(Pm+P-1)]. \quad (1)$$

Therefore, embodiments of feed forward equalizer input multiplexer 262 can define the content of FFE input register 222 by the equation $$Y(m)=[y(Pm+P-1+D_w)y(Pm+P-2+D_w) \ldots y(Pm+D_w) \\ y(P(m-1)+P-1+D_w) \ldots y(P(m-1)+1+D_q)]. \quad (2)$$

Embodiments of feed forward equalizer 220 can include $N_w$ symbol-spaced taps where the sample from each tap can be multiplied by an element w(n) of coefficient (weight) vector W(m) (realigned by coefficient multiplexer 264), which can be defined by the equation $$W(m)=[w_{-D_w}(m)w_{-D_w+1}(m) \ldots w_{N_w-D_w-1}(m)] \quad (3)$$

where parameter $D_w$ corresponds to cursor position 226. Therefore the elements $y_w(n)$ of feed forward equalizer output vector $Y_w(m)$ (corresponding to set 130 of FFE output symbols) can be defined by the series $$y_w(n) = \sum_{i=-D_w}^{N_w-D_w-1} w_i(m)y(n-i) \quad (4)$$

(note that the output of feed forward equalizer 220 is dependent on parameter $D_w$ corresponding to cursor position 226). In embodiments of the feed forward equalizer 220 where $N_w=8$, for example, the value of parameter $D_w$ may vary between 0 and 7.

Figure 4B:
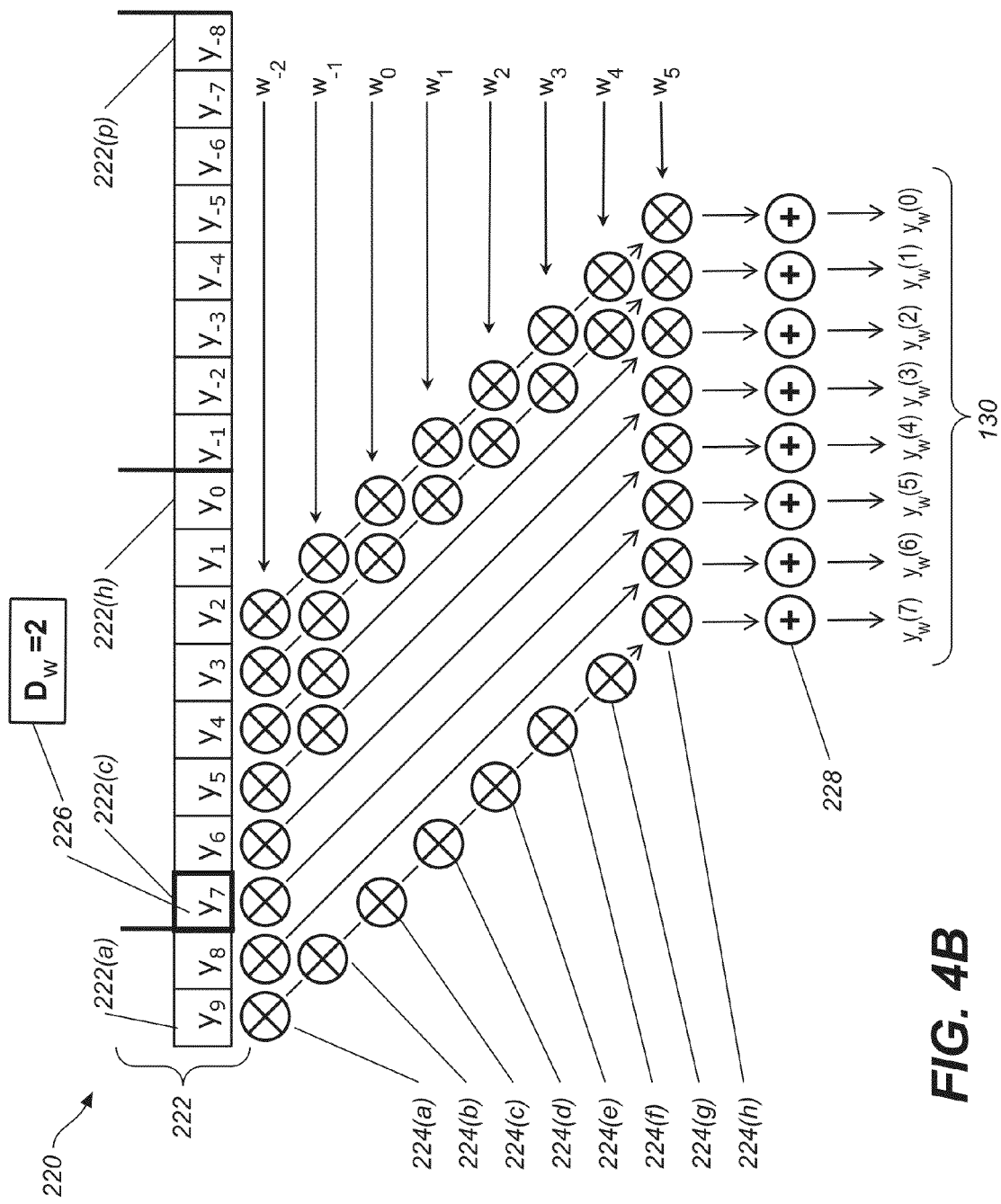
FIG. 4B is a diagram of a feed forward equalizer according to an embodiment of the present invention.

Referring now to FIG. 4B, in embodiments of the feed forward equalizer 220 when parameter $D_w=2$, data can be aligned so that cursor position 226 corresponds to register position $222(c)$ and input sample $y_7$ stored therein, two positions away from "leftmost" register position $222(a)$. Input symbol storage in register 222 includes the range from input sample $y_9$ at register position $222(a)$ through input sample $y_{-5}$ at register position $222(p)$. Feed forward equalizer 220 can thus filter two pre-cursor symbols $y_9$ and $y_8$ and five post-cursor symbols $y_6, y_5, \ldots y_2$.

Figure 5A:
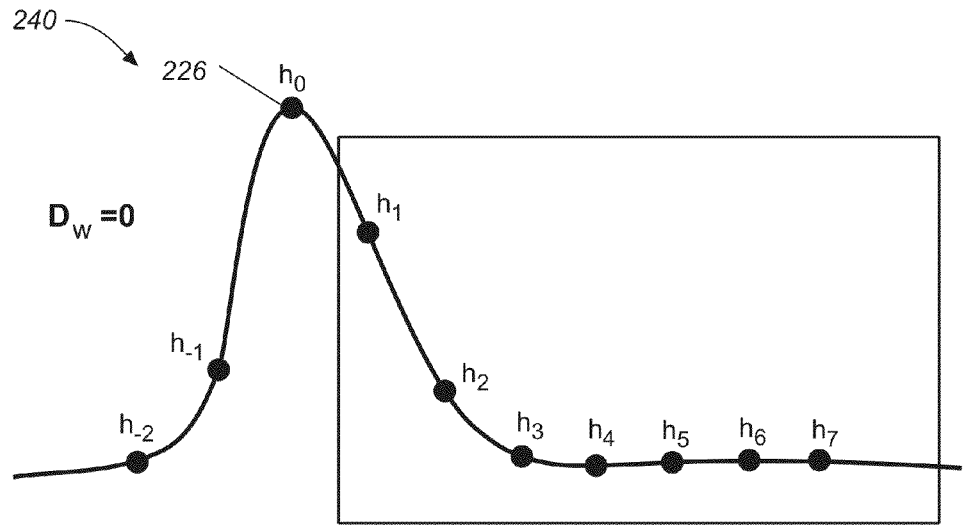
FIG. 5A is a diagram of ISI correction according to an embodiment of the present invention.
Figure 5B:
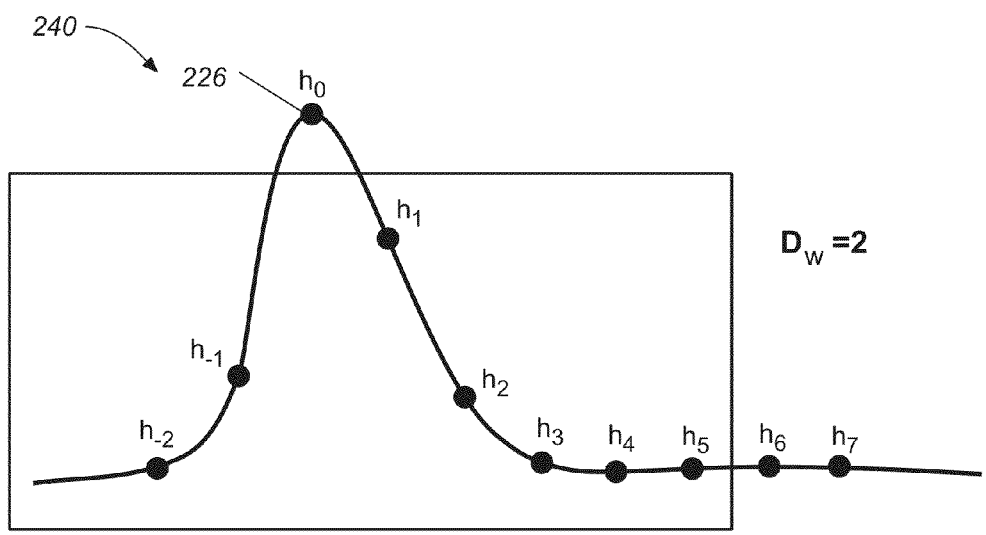
FIG. 5B is a diagram of ISI correction according to an embodiment of the present invention.

FIGS. 5A and 5B illustrate pre-cursor and post-cursor symbols as shown in FIGS. 4A and 4B as notated by embodiments of decision feedback equalizer (DFE) 240. In embodiments of data path 200, cursor position 226 (and thus data alignment) is always aligned to $h_0$, the DFE cursor (and thus the DFE error signal); the alignment of $h_0$ is a reference defined by the bit currently being processed by the DFE. Referring to FIG. 5A, in embodiments where parameter $D_w=0$, two post-cursor symbols $h_1$ and $h_2$ are used for correcting inter-symbol interference by 8-way parallel DFE 240. When $D_w=0$, cursor position 226 is aligned with DFE cursor $h_0$ and there are seven post-cursor taps $w_1, w_2, \ldots w_7$ in feed forward equalizer 220, the first two ($w_1$ and $w_2$) being aligned to the two DFE taps present, $h_1$ and $h_2$. Referring to FIG. 5B, in embodiments where parameter $D_w=2$, cursor position 226 is aligned with DFE cursor $h_0$ and the two pre-cursor taps $h_{-2}$ and $h_{-1}$ not utilized by the DFE are aligned with the two pre-cursor taps $w_{-2}$, $w_{-1}$ of the FFE. Out of the five post-cursor taps $w_1$, $w_2, \ldots w_5$ in feed forward equalizer 220, the first two, $w_1$ and $w_2$, are aligned to the two DFE taps present, $h_1$ and $h_2$.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An apparatus for equalization of input signals including at least one input symbol in a communications channel, comprising:
    an adaptive filter configured to generate a plurality of coefficients;
    at least one feed forward equalizer configured to receive and store a plurality of input symbols for correction of inter-symbol interference and including:
        (a) an input register including a plurality of register positions, each register position configured to store an input symbol of the plurality of input symbols;
        (b) a variable cursor position defined by a parameter corresponding to a register position of the plurality of register positions, configured to select a first plurality of pre-cursor coefficients and a second plurality of post-cursor coefficients from the plurality of coefficients;
        (c) a plurality of multiplier banks configured to generate a plurality of partial result symbols by applying the plurality of coefficients to the plurality of input symbols; and
        (d) at least one adder bank configured to generate a plurality of equalized output symbols by combining elements of the plurality of partial result symbols corresponding to each input symbol of the plurality of input symbols;
    a first multiplexer configured to adjust the plurality of input symbols according to the parameter;
    a second multiplexer configured to adjust the plurality of coefficients according to the parameter; and
    a controller configured to choose the value of the parameter from a set of possible values.

2. The apparatus of claim 1, wherein the apparatus is embodied in a serializer-deserializer (SerDes) receiver device.

3. The apparatus of claim 1, wherein the at least one feed forward equalizer has N coefficients and level of parallelism P, where N and P are positive integers.

4. The apparatus of claim 3, wherein:
    the plurality of input symbols consists of a set of P input symbols;
    the plurality of multiplier banks consists of a set of P multiplier banks;
    the plurality of partial result symbols consists of a set of P partial result symbols; and
    the plurality of equalized output symbols consists of a set of P equalized output symbols.

5. The apparatus of claim 3, wherein the plurality of possible values of the parameter consists of the continuous range of integers from zero to N−1.

6. The apparatus of claim 1, wherein the adaptive filter is configured to set the coefficient corresponding to the parameter to a constant value.

7. A method for equalizing input signals in a communications channel, comprising:
    receiving a plurality of input symbols;
    storing the plurality of input symbols in a plurality of register positions in a feed forward equalizer, the feed forward equalizer having a variable cursor position defined by a parameter corresponding to a register position of the plurality of register positions;
    selecting the value of the parameter from a plurality of possible values;
    adjusting the plurality of input symbols according to the parameter;
    adjusting a plurality of coefficients, including a plurality of pre-cursor coefficients and a plurality of post-cursor coefficients, according to the parameter;
    applying the plurality of coefficients to the plurality of input symbols to generate a plurality of partial result symbols via the feed forward equalizer; and
    combining elements of the plurality of partial result symbols corresponding to each input symbol of the plurality of input symbols to generate a plurality of equalized output symbols via the feed forward equalizer.

8. The method of claim 7, wherein the feed forward equalizer is embodied in a serializer-deserializer (SerDes) receiver device.

9. The method of claim 7, wherein adjusting the plurality of input symbols according to the parameter includes adjusting the set of input symbols according to the parameter via a first multiplexer.

10. The method of claim 7, wherein adjusting the plurality of coefficients according to the parameter includes adjusting the plurality of coefficients according to the parameter via a second multiplexer.

11. The method of claim 7, wherein the feed forward equalizer has N coefficients and level of parallelism P, where N and P are positive integers.

12. The method of claim 11, wherein:
    the plurality of input symbols consists of a set of P input symbols;
    the plurality of partial result symbols consists of a set of P partial result symbols; and
    the plurality of equalized output symbols consists of a set of P equalized output symbols.

13. The method of claim 11, wherein the plurality of possible values of the parameter consists of the continuous range of integers from zero to N−1.

14. The method of claim 7, wherein the coefficient corresponding to the parameter is preset to a constant value.

15. A computer program product consisting of a non-transitory, computer-readable medium bearing code executable by a computing device or processor encoded thereon, the code including instructions for implementing a method, the method comprising:

receiving a plurality of input symbols;

storing the plurality of input symbols in a plurality of register positions in a feed forward equalizer, the feed forward equalizer having a variable cursor position defined by a parameter corresponding to a register position of the plurality of register positions;

selecting the value of the parameter from a plurality of possible values;

adjusting the plurality of input symbols according to the parameter;

adjusting a plurality of coefficients, including a plurality of pre-cursor coefficients and a plurality of post-cursor coefficients, according to the parameter;

applying the plurality of coefficients to the plurality of input symbols to generate a plurality of partial result symbols via the feed forward equalizer; and combining elements of the plurality of partial result symbols corresponding to each input symbol of the plurality of input symbols to generate a plurality of equalized output symbols via the feed forward equalizer.

* * * * *